United States Patent [19]

Carruthers

[11] Patent Number: 5,054,677
[45] Date of Patent: * Oct. 8, 1991

[54] PIPE BURSTER

[75] Inventor: Alec R. Carruthers, Bratton, England

[73] Assignee: British Gas plc, London, England

[*] Notice: The portion of the term of this patent subsequent to May 29, 2007 has been disclaimed.

[21] Appl. No.: 535,203

[22] Filed: Jun. 8, 1990

[30] Foreign Application Priority Data

Jun. 9, 1989 [GB] United Kingdom ................ 8913318

[51] Int. Cl.⁵ .............................................. F16L 55/18
[52] U.S. Cl. ...................................... 225/106; 138/97
[58] Field of Search .................... 225/103, 93; 166/55, 166/55.1, 55.2; 405/154, 156; 138/97, 178

[56] References Cited

U.S. PATENT DOCUMENTS 4,505,302  3/1985  Streatfield et al. ................. 225/103
4,928,866  5/1990  Carruthers .......................... 225/106

FOREIGN PATENT DOCUMENTS 2092701  8/1982  United Kingdom .
2124325  2/1984  United Kingdom .
2169681  7/1986  United Kingdom ................ 405/154
2214260  8/1989  United Kingdom .

Primary Examiner—Hien H. Phan
Attorney, Agent, or Firm—Larson and Taylor

[57] ABSTRACT

A pipe burster for cracking gas and other pipes preparatory to inserting a replacement pipe in the passage so formed. The burster comprises an elongated body tapering in the lengthwise direction and made up first and second parts 2,14 extending in said direction. The parts are connected by a transverse pivot pin 20. The first part 12 is received within the second part and carries a piston and cylinder 22 by which the parts are separable. The circumference of the body is substantially a closed curve and within the length of the first part the circumference is increased by said separation. Therefor the burster makes a clearance by said separation into which the burster can be advanced. In a modification more than one piston and cylinder is provided.

6 Claims, 4 Drawing Sheets

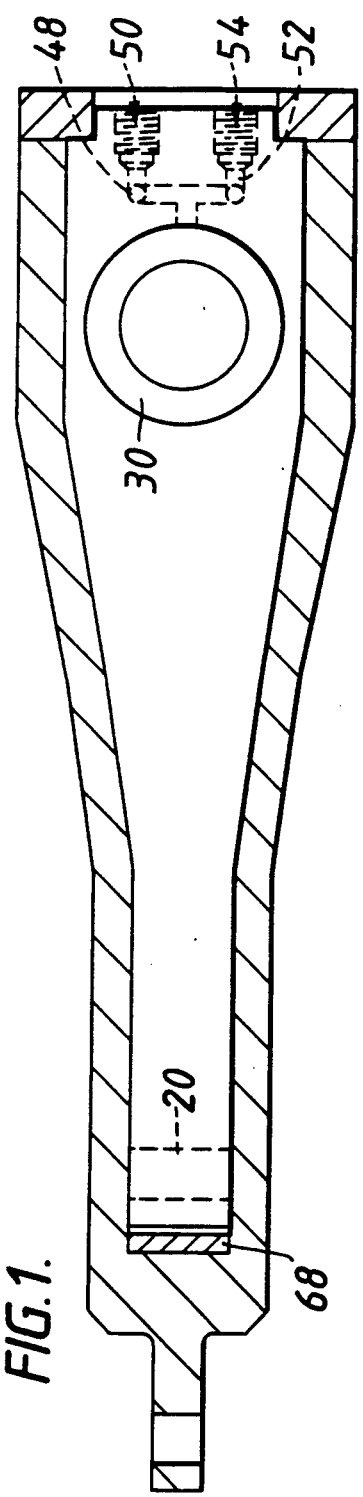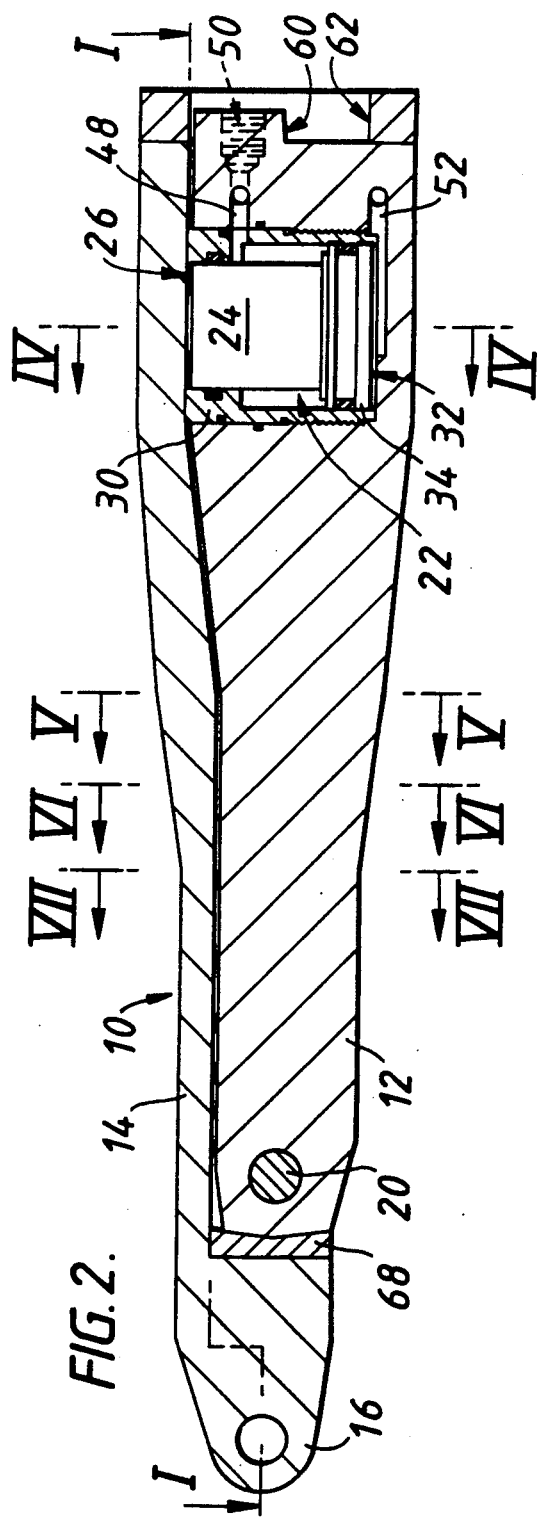

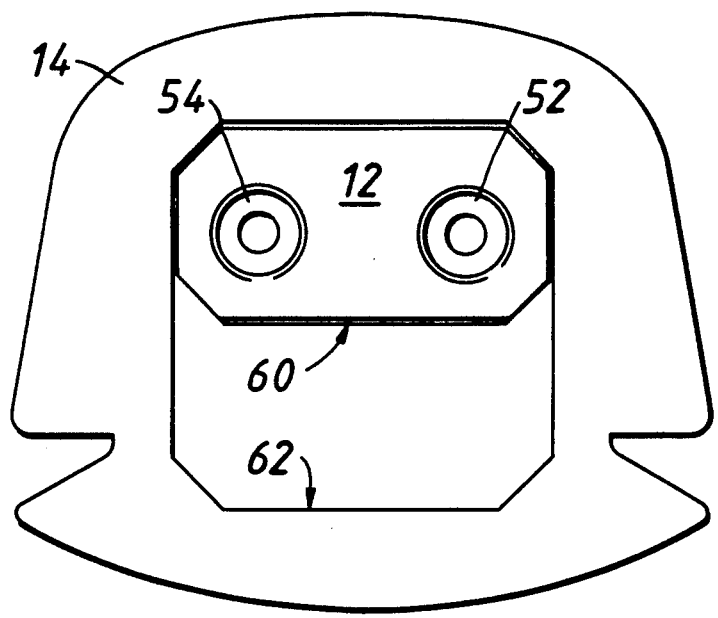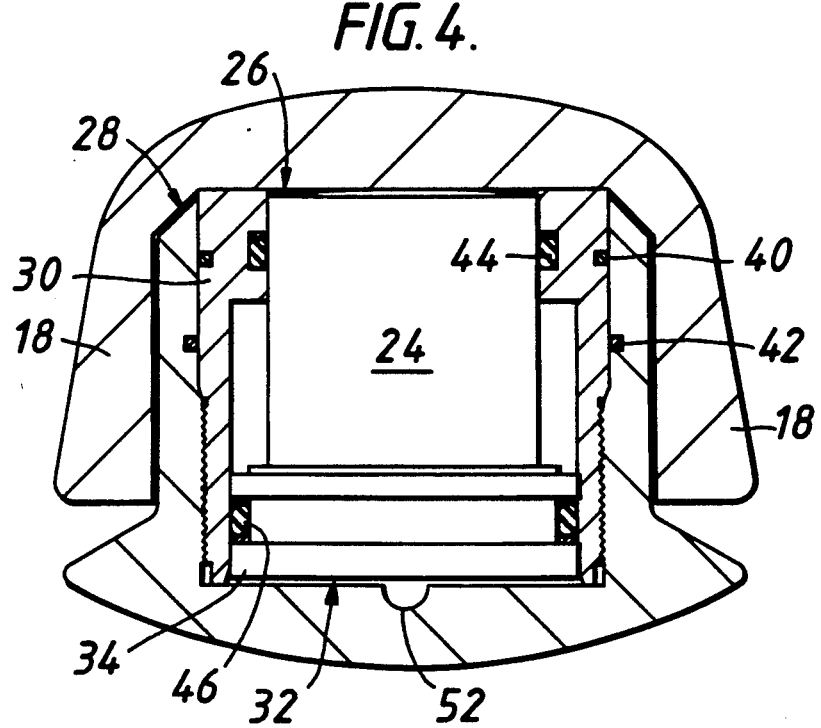

PIPE BURSTER

The invention relates to pipe bursters.

It is known to replace existing pipes, such as distribution mains for natural gas by bursting the pipe using a pipe burster and inserting to new pipe in the passage in the ground formed by the burster. That technique is described for example in British patents Nos. 2092701 and 2169681 which also describe proposed examples of pipe bursters.

In UK patent No. 2092701 there is described a mole which has three or more blades pivotted to the mole. The blades are forced outwardly to crack a pipe by means of a hydraulically driven ram. After the pipe has been cracked, the mole is pulled forwardly through the pipe to displace the cracked pipe and surrounding earth by the tapered enlarged body to the rear of the blades.

In another embodiment the mole is driven forward by a pneumatically—powered impact mechanism, the blades remaining fixed. One blade is pivotted at the front and is acted on by a hydraulic piston and cylinder to force the blade outwardly to crack a pipe point. Thereafter, the mole advances under the action of the impact mechanism to displace the cracked pipe and surrounding earth by the tapered enlarged body to the rear of the blades.

In neither embodiment is earth displaced by both the blade and the mole. In other words the action is as follows: first, the blades or blade is extended and then retracted; second the mole advances to displace the cracked pipe and surrounding earth. Such action requires a very high force for advancing the mole, since it has to displace cracked pipe and soil as it advances.

The object of the invention is to provide a pipe burster which displaces the cracked pipe and the surrounding earth by means of the separation of the parts about the pivot pin and then advances into the clearance thus made.

A pipe burster of known type comprises an elongated body tapering in the lengthwise direction of the body and being made up of first and second parts extending in said direction, the parts being connected by a transverse pivot pin and the parts being separable about the pin by means of hydraulically actuated piston and cylinder means.

Such a burster is characterised, according to the invention, in that the separation of the parts about the pivot pin is such as to make a clearance into which the burster can be advanced, the first part housing the piston and cylinder means and being received within the second part, which second part is of channel shape where it receives the first part and has side walls between which the first part is received, the circumference of the body being substantially a closed curve and within the length of the first part the circumference of the body is increased by said separation.

One embodiment of burster will now be described by way of example with reference to the accompanying drawings in which:

FIG. 1 is a horizontal section through the upper part of the body as indicated at I—I in FIG. 2, to a smaller scale;

FIG. 2 is a vertical section through the complete burster, to the same scale as FIG. 1, FIG. 3 is an end elevation looking at the right-hand end of FIG. 2, to a larger scale;

Figure 5:
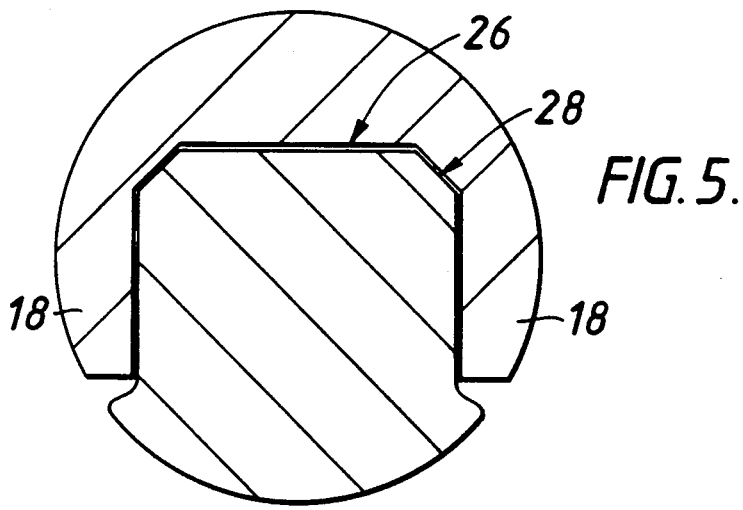
Figure 6:
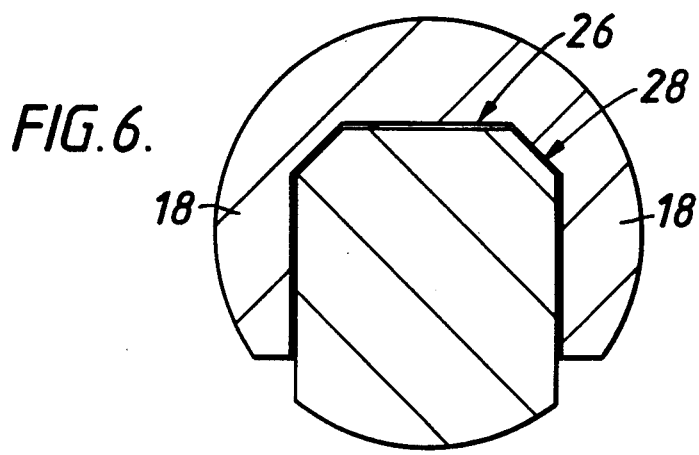
Figure 7:
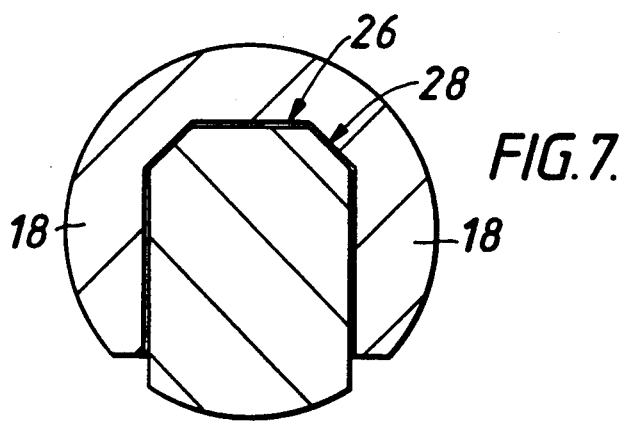
Figure 8:
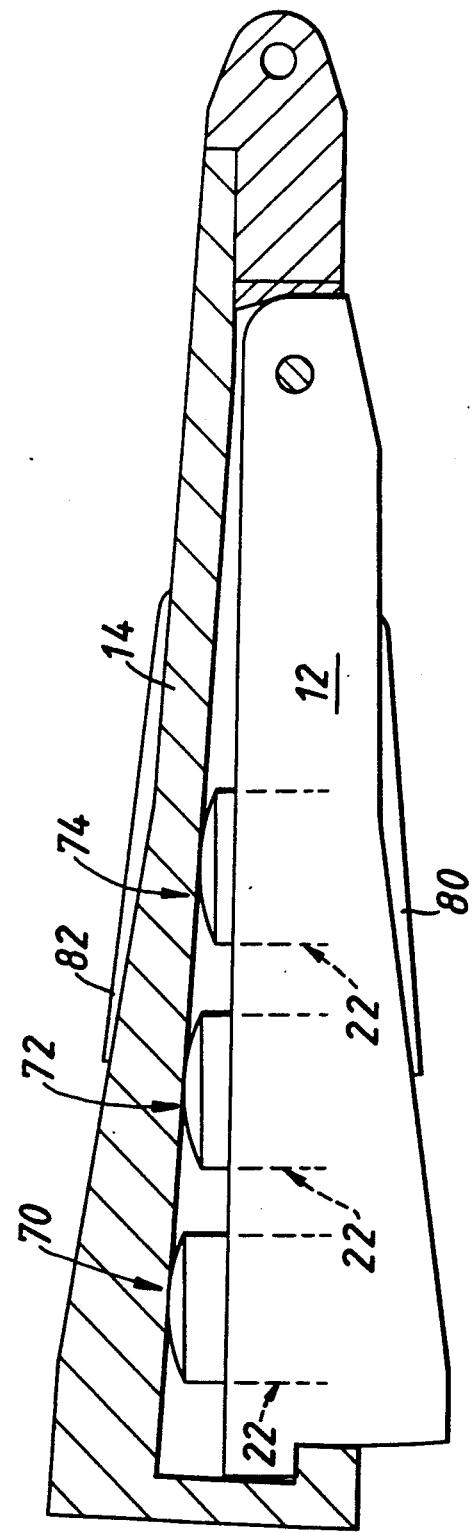

FIGS. 4 to 7 are vertical sections on the lines IV—IV; V—V; VI—VI and VII—VII in FIG. 2, to the same scale as used in FIG. 3; and FIG. 8 is a longitudinal, vertical elevation through a modified form of burster.

The burster 10 comprises a first or lowermost part 12 and a second, uppermost part 14, both parts extending in the lengthwise direction of the burster 10. The parts 12,14 are both shaped so as to give to the burster 10 a shape tapering in the lengthwise direction towards the front end, where an eye 16 is provided on the second part. The first part 12 is received within the second part 14, which is channel shaped where it receives the first part 12. The second part 14 has side-walls 18 between which the first part 12 is received.

The two parts 12,14 are connected by a transverse pivot pin 20. The first part 12 has a piston-and-cylinder mechanism 22, the piston rod 24 of which bears upon the base 26 of the channel 28 in the second member 14. The piston-and-cylinder mechanism 22 comprises a cylinder 30, fitted in an aperture 32 in the second part 14, and a piston 34 slidable in the cylinder 30. The cylinder 30 has an 0-ring 40. The wall of the aperture 32 carries another 0-ring 42 bearing on the cylinder 30. The cylinder 30 has an 0-ring 44 bearing on the piston rod 24. The piston 34 has an 0-ring 46 engaging the inside of the cylinder 30 (see FIG. 4).

The interior of the cylinder 30 above the piston 34 is connected to the hydraulic supply (not shown) by a passage 48 connected to a connection 50 for an hydraulic hose. The cylinder below the piston 24 is connected by a passage 52 to another connection 54. The connection 54 supplied fluid under high-pressure to force the piston 34 outwardly. The connection 50 allows fluid to be supplied to the top of the piston 34 to cause it to return inwardly.

The first part 12 has a stop surface 60, which engages with a stop surface 62 on the second part 14 at full stroke of the piston-and-cylinder mechanism 24.

Soil particles are prevented from entering channel shaped part 14 in front of the part 12 by a rubber block 68, which is compressed between the two parts immediately in front of the pivot pin 20.

The burster 10 is used for bursting a pipe e.g. a gas distribution cast iron main. Excavations are opened at each end of a length of pipe to be burst and the burster is pulled through the pipe by means of a winch cable extending through the pipe and attached to the eye 16. The burster 10, as illustrated, is intended for bursting a 4-inch (100 millimeter) nominal bore cast iron pipe. Such a pipe has a thickness of 0.4-inch (10 mm). However, the bell and socket joints used on such mains have a maximum thickness of about 1.2-inch (38 mm). The maximum force necessary to break such joints is 14 to 15 tons (140 to 150 kN). The burster has been designed to exert such a force when the pipe or joint is positioned at the second line VI—VI.

The mode of operation of the burster 10 is firstly to expand the two parts 12,14 by extension of the piston-and-cylinder mechanism 22. This breaks the pipe or joint and displaces the cracked pipe or joint and the surrounding soil outwardly to form a clearance. Then, as the clearance is formed, the tension on the winch rope pulls the burster 10 forwardly into the clearance so formed.

FIG. 8 shows a burster having three piston and cylinders 22. The first of these is at the position 70 where the piston and cylinder of the first embodiment is shown.

The other two are at the positions 72 and 74 are at positions to support the bending moment imposed on the body by the pipe. In particular the piston and cylinder at the position 74 is close to or at that position. The piston and cylinder at the position 72 may be omitted in another embodiment. In FIG. 8 the two members 12,14 have ribs 80,82 to cause concentrated forces to act on the pipe. The ribs are optional.

Both embodiments have in each side wall 18 near the lower edge a longitudinal seal engaging the member 12 in rubbing engagement. Also, a transverse seal is provided in the rear plate forming the end wall of the channel shaped part 14. This seal is located just below the stop surface 62 and engages the part 12 in rubbing engagement. These seals prevent ingress of soil particles between the parts 12,14. The aperture in the end wall is closed by an adaptor (not shown) which provides for hydraulic connections.

Although the end wall of the channel-shaped part 14 is shown as a flat plate in the drawings it is in fact machined as a radius of curvature (centred on the centre of the pivot pin 20) at its inner face carrying the seal just referred to. The end face of the part 12 is similarly machined.

The embodiment shown in FIGS. 1 to 7 is preferred for the smaller sizes of pipe e.g. 4-inch, In that case, it is necessary to use a lever principle to magnify the applied forces at a pipe joint, for example, because the pipe size restricts the use of a directly-acting piston-and-cylinder device without compromising the mechanical strength of the burster.

I claim:

1. A pipe burster comprising an elongated body tapering in the lengthwise direction of the body and comprising first and second parts extending in said direction, a transverse pivot pin connecting said parts together, and a hydraulically actuated piston and cylinder means for producing separation of said parts about the pin of an amount such as to crack the pipe and displace the cracked pipe and surrounding earth so as to provide a clearance into which the burster can be advanced, the first part carrying the piston and cylinder means and second part being of channel shape and including side walls between which the first part is received, the circumference of the body being substantially a closed curve and the circumference of the body being increased by said separation of said parts within the length of the first part.

2. A pipe burster as claimed in claim 1 wherein said hydraulically actuated piston cylinder means comprises at least one piston and cylinder unit for generating hydraulic separation forces outside of the unburst pipe so as to crack the pipe and displace the cracked pipe and the surrounding earth.

3. A pipe burster as claimed in claim 1 wherein said piston and cylinder means is disposed within said body relative to the end of the pipe and the pivot pin such that the piston and cylinder means acts as a force multiplying lever.

4. A burster according to claim 1, the piston and cylinder means comprising a single piston and cylinder (22).

5. A burster according to claim 1, the piston and cylinder means comprising more than one piston and cylinders (22).

6. A burster according to claim 5, one of said piston and cylinders (22) being positioned on or close to the point at which the burster first engages the unbroken pipe.

* * * * *